United States Patent [19]

Byers

[11] 4,324,489
[45] Apr. 13, 1982

[54] APPARATUS FOR MODIFYING IMAGES ON PHOTOGRAPHIC FILM

[76] Inventor: Thomas L. Byers, P.O. Box 26624, Oklahoma City, Okla. 73126

[21] Appl. No.: 183,119

[22] Filed: Sep. 2, 1980

Related U.S. Application Data

[63] Continuation-in-part of Ser. No. 5,617, Jan. 22, 1979, Pat. No. 4,268,166.

[51] Int. Cl.³ .............................................. G03B 27/10
[52] U.S. Cl. ...................................... 355/84; 355/103
[58] Field of Search ....................................... 355/40-43, 355/50-52, 72, 77-81, 84, 95, 103, 132, 133

[56] References Cited

U.S. PATENT DOCUMENTS

| | | | |
|---|---|---|---|
| 2,286,883 | 6/1942 | Weber | 355/133 |
| 3,204,544 | 9/1965 | Shannon | 355/133 |
| 3,264,106 | 8/1966 | Alldis | 355/79 X |
| 3,445,165 | 5/1969 | Dubbs | 355/84 |
| 3,449,048 | 6/1969 | Allison | 355/95 X |
| 3,743,415 | 7/1973 | Gilman | 355/52 |
| 3,767,301 | 10/1973 | Solo | 355/52 |
| 3,927,942 | 12/1975 | Byers | 355/84 |
| 4,105,328 | 8/1978 | Wasson et al. | 355/52 X |

*Primary Examiner*—L. T. Hix
*Assistant Examiner*—W. J. Brady
*Attorney, Agent, or Firm*—Robert K. Rhea

[57] ABSTRACT

A photographic exposure apparatus and method for preparing production artwork of an image to be reproduced by photo-engraving. Prior art handwork or manually operated devices employed in modifying artwork images required high levels of skill and considerable time to achieve satisfactory results.

The subject apparatus includes a movable panel superposed on a stationary plate for supporting a film containing an image to be reproduced in contiguous contact with a light sensitive sheet superposed on the stationary plate. An eccentric motion dial guide connected with a drive motor and connected with the film support panel is manually adjusted and the motor energized for orbital movement of the film support panel in a path of predetermined magnitude during exposure of the image on the light sensitive sheet.

7 Claims, 14 Drawing Figures

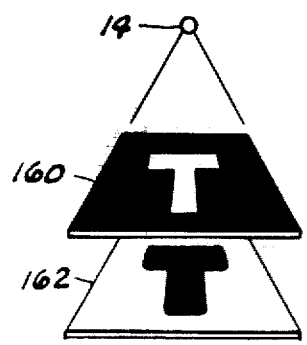
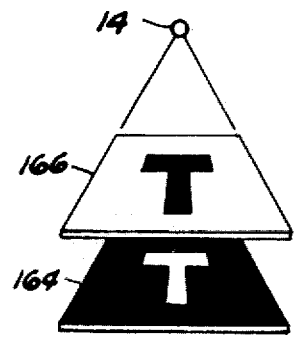
FIG.11  FIG.12
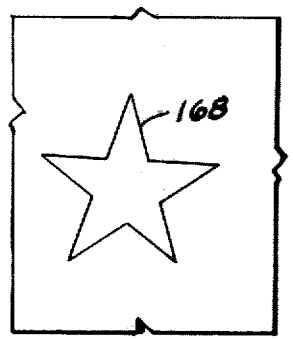
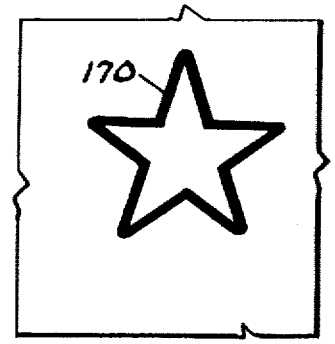
FIG.13  FIG.14

APPARATUS FOR MODIFYING IMAGES ON PHOTOGRAPHIC FILM

CROSS REFERENCE TO RELATED APPLICATIONS

This application is a continuation-in-part of an application filed by me in the United States Patent and Trademark Office on Jan. 22, 1979, Ser. No. 5,617 now U.S. Pat. No. 4,268,166; entitled APPARATUS AND METHOD FOR MODIFYING IMAGES ON PHOTOGRAPHIC FILM and a continuation of an international application filed by me on Apr. 7, 1980, Ser. No. PCT/US80/00375, entitled APPARATUS FOR MODIFYING IMAGES ON PHOTOGRAPHIC FILM.

BACKGROUND OF THE INVENTION

1. Field of the Invention

The present invention relates to the preparation of reproducible artwork and more particularly to an apparatus for modifying images on photographic film.

In the graphic arts industry "camera ready" artwork of the image to be printed is necessary for presentation to the photographic stages of producing a lithographic plate or an engraving cut for subsequent printing. The artwork may be a design, a letter of a type font, a composition of letters or words or an entire type font. Two similar modifications frequently required are: "adding to or subtracting from" a given amount of all defining edges of the image to be reproduced. Such modifications are commonly referred to as "swells, spreads, or plus images" or "shrinks, chokes, or minus images", respectively. Another version of the "adding to" modification of an image is creating a "shaded or shadow" area along selected edges of the image to obtain the illusion of three-dimensions. In modifying an image for reproduction particularly where more than one printing plate is necessary to print the respective components of the image in different colors, it is essential that the artwork forming the camera ready copy be capable of meeting reproduction requirements to obtain accurate registration when one color plate is printed over another.

2. Description of the Prior Art

Prior art U.S. Pat. No. 3,927,942 provides a centrally apertured planar base plate for holding a sheet of unexposed photographic film thereon by a vacuum source and a cable guided overlying transparent sheet supporting a film containing an image to be reproduced and moved in an orbital or linear direction in unison with the transparent sheet relative to the unexposed film by a control knob manually inserted into and guided along a template supported by the base.

The principal disadvantage of the device disclosed by this patent is the manual operation which requires the operator to achieve smooth orbital or linear motion of the film containing the image when attempting to trace a template with a mandrel. Repeated consistent and uniform plus or minus image exposures on the order of thousandths of an inch or centimeter cannot be obtained by this prior art on account of the flexible guide cables and necessary tolerance of mating parts, such as the bearings mounting the cable pulleys.

Other techniques presently used for obtaining modification of artwork images include handwork methods and light diffusion methods. The handwork method requires a high level of skill on the part of the workman and considerable time to obtain satisfactory results. The time factor is directly proportional to the number of images, such as letters forming words to be modified by hand. Light diffusion is accomplished by interposing a clear film spacer between the image bearing film and an unexposed film. The exposing light is moved angularly around the films allowing the light to strike in at all angles to undercut the perimeter of the image forming a modified image on the exposed film. This method achieves approximately one-half millimeter undercut of the image for each exposure and additional exposures to obtain further undercuts results in loss of definition and a resulting poor quality of image. Further, when using this method of modification it is difficult to obtain identical and predictable results.

SUMMARY OF THE INVENTION

The present invention eliminates the inaccuracies of handwork or manually operated devices including a film holding vacuum source by providing an apparatus having an adjustable drive guide imparting micro orbital motion of the film and image being modified and further provides an accurate repeatable visual indication of the magnitude of movement of the film and image.

A generally rectangular planar base is disposed in a photographic darkroom below a point light source controlled by light intensity and timing devices. A planar face plate centrally overlies the base and its upper surface is scored with lines representing the outside dimensions of standard film sizes. A film registration bar is supported by the base adjacent the forward limit of the face plate. An upright backboard, supported by the base, is provided with scored lines of identical size with respect to the film position lines scored on the face plate. A transparent planar film carriage panel is supported by the backboard when receiving an image bearing film and is subsequently supported in contiguous overlying contact on the face plate and movable with respect thereto by a film carriage support assembly including control arms extending between the base and film carriage for maintaining the marginal edges of the film carriage parallel with the face plate during movement of the film carriage.

A manually adjustable eccentric motion dial drive guide having an upstanding mandrel is mounted on the base adjacent the forward limit of the face plate and driven by a motor mounted on the depending surface of the base for moving the film carriage relative to the face plate when the mandrel is inserted through an aperture in the film carriage.

The purpose of the eccentric dial is to uniformly increase or decrease the image on the film supported by the film carriage when exposed on an underlying photographic film wherein the amount of increase or decrease is determined by the manually adjustable radius of the orbital motion imparted by the drive guide mandrel.

BRIEF DESCRIPTION OF THE DRAWINGS

FIGS. 11 and 12 are exploded perspective views of film illustrating the two basic functions of the apparatus;

FIG. 13 is a top view of a film fragment containing a graphic image to be modified; and, FIG. 14 is an example of a plus image formed from the graphic image contained by the film of FIG. 13.

DESCRIPTION OF THE PREFERRED EMBODIMENTS

Figures 1, 2:
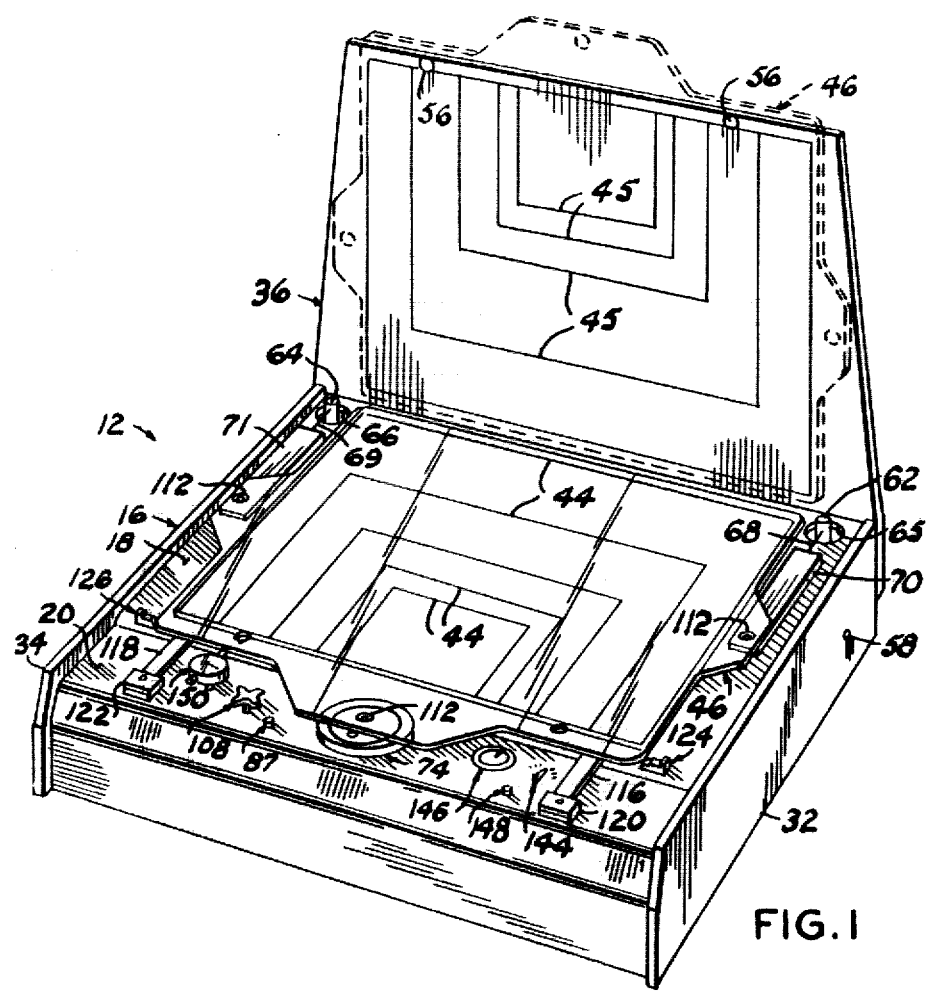
FIG. 1 is a perspective view of the apparatus in operative position and illustrating, by broken lines, the film carriage panel when supported by the backboard.
FIG. 2 is a perspective view of the film carriage panel per se.
Figure 3:
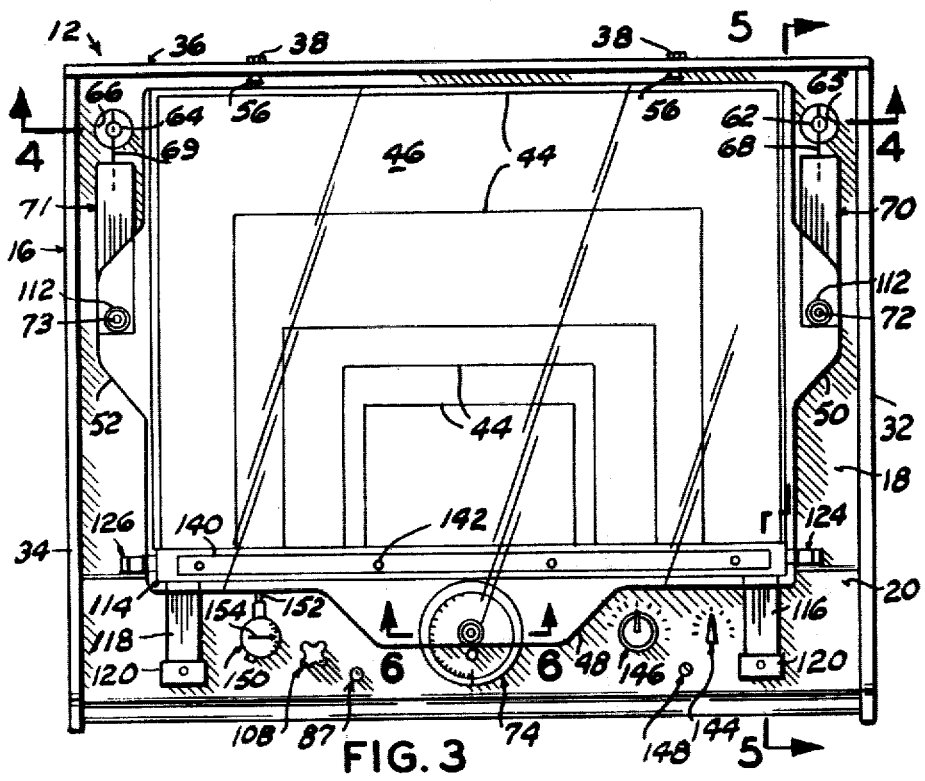
FIG. 3 is a top view of FIG. 1.
Figure 4:
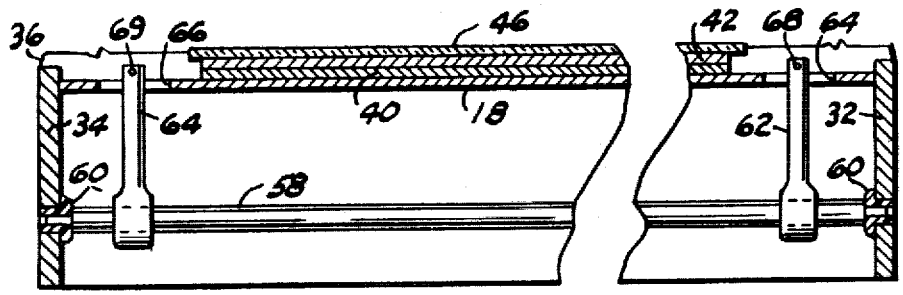
FIGS. 4, 5 and 6 are fragmentary vertical cross sectional views, to a larger scale, taken substantially along the lines 4—4; 5—5 and 6—6, respectively of FIG. 3.
Figure 5:
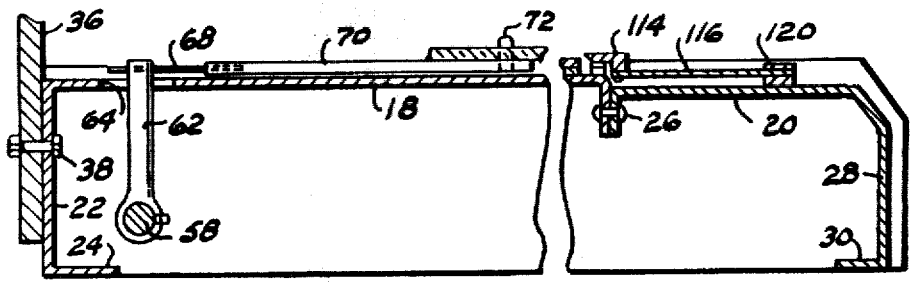
Figure 6:
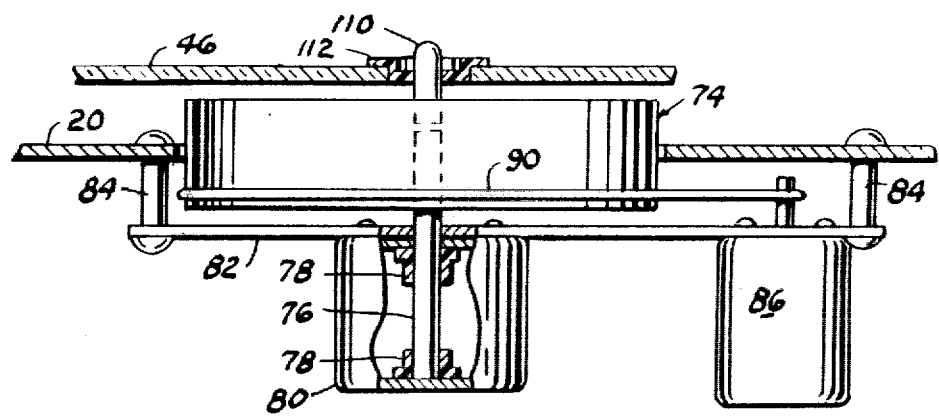
Figure 7:
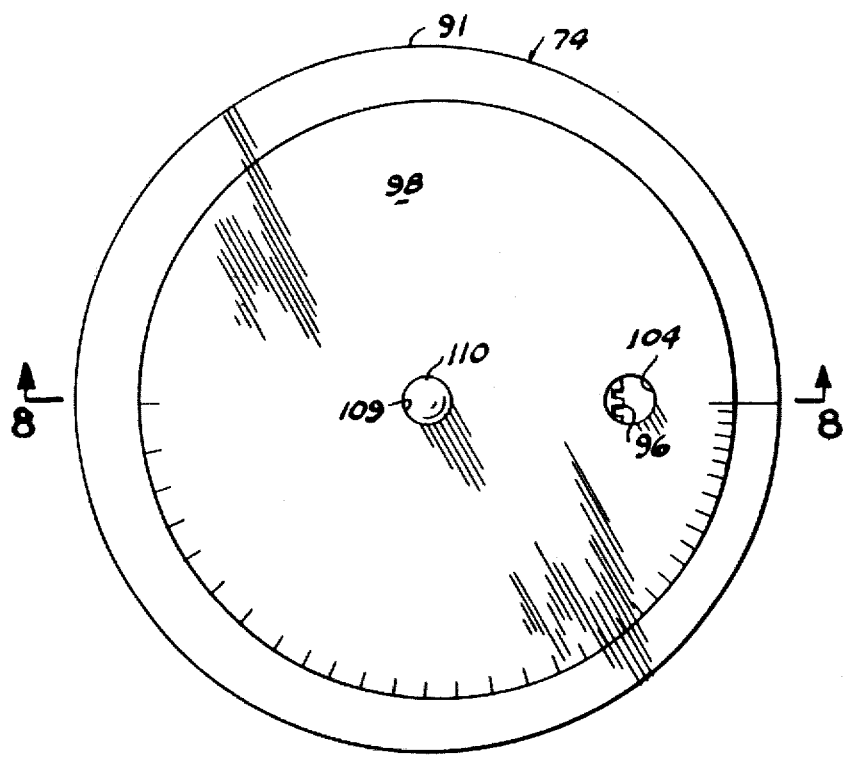
FIG. 7 is a top view of the adjacent eccentric dial, per se.
Figure 8:
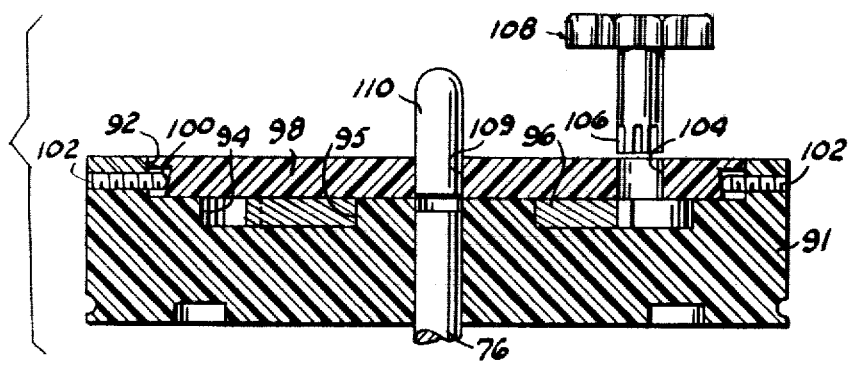
FIG. 8 is a vertical cross sectional view taken substantially along the line 8—8 of FIG. 7 and illustrating the dial adjustment key in exploded relation.

Like characters of reference designate like parts in those figures of the drawings in which they occur.

In the drawings:

Referring more particularly to FIGS. 1 through 10, the reference numeral 12 indicates the apparatus which is rectangular-box like in general configuration located in a photographic darkroom, not shown, below a point light source 14 (FIGS. 11 and 12). The apparatus 12 comprises a base portion 16 having a top surface defined by a planar rearward chassis 18 joined at its forward edge to a front planar chassis 20. The rearward edge portion of the chassis 18 is turned downwardly and forwardly at its rearward end to form a rearward wall 22 and a base support 24. The forward end edge of the chassis 18 and rearward end edge of the front chassis 20 are turned downwardly and joined, as by bolts 26, in flange abutting relation transversely of the base 16 with the top surface of the forward chassis disposed in a horizontal plane spaced downwardly with respect to the plane of the rearward chassis top for the purposes presently apparent.

The forward edge portion of the front chassis 20 is turned downwardly and rearwardly to form a forward wall 28 and base support 30 for the base. Opposing side edges of the chassis 18 and 20 are closed by coextensive side panels 32 and 34. The base 16 is provided with an upstanding backboard 36 which overlaps, at its depending end, the rearward chassis wall 22 and is secured thereto, as by bolts 38, for the purposes presently explained.

A base panel 40 (FIG. 4) overlies the top surface of the rearward chassis 18 between its forward and rearward limits and spaced inwardly from the side panels 32 and 34 a selected distance. An opaque, preferably glass, face plate 42, at least coextensive with the base panel 40, is superposed thereon. The face plate 42 is scored or printed with a plurality of lines, as at 44, terminating at its forward edge to define a plurality of rectangular-like box areas of different dimensions corresponding to standard size film sheets to be secured thereto within the respective box area during operation of the apparatus.

The forwardly disposed surface of the backboard 36 is similarly provided with scored lines 45 terminating adjacent the top edge of the backboard defining identical sized rectangular box areas with respect to the boxed area positions on the face plate 42 for the purposes of aligning film containing a graphic image to be modified with unexposed film.

A film carriage 46, formed from transparent plastic sheet material, having overall dimensions at least coextensive with the dimensions of the face plate 42, supports film having a graphic image to be modified, as presently explained. The film carriage 46 is provided with an apertured forwardly projecting ear 48 and opposing laterally directed apertured ears 50 and 52 for moving the film carriage 46 with respect to the face plate 42 in the manner presently described. The film carriage is further provided with a pair of apertures 54 adjacent its forward edge for receiving cooperating pins 56 secured to the forward upper edge surface of the backboard 36 for supporting the film carriage when placing film thereon.

A shaft 58 extends horizontally between and is journalled by the side panels 32 and 34 below the top of the rearward chassis 18 and spaced forwardly of its rear wall 22. The respective end portions of the shaft are diametrically reduced for receiving bushings 60 in turn received by suitable apertures formed in the respective side panel in close fitting relation eliminating any axial movement of the shaft and radial movement within the respective bushing 60.

A pair of upstanding posts 62 and 64 are secured to the respective end portions of the shaft 58 and project upwardly through loosely surrounding apertures 65 and 66 formed in the top surface of the rearward chassis 18 between the face plate 42 and the respective side panel 32 and 34. The upper end portion of each post 62 and 64 is transversely drilled on an axis parallel with the planes of the side panels 32 and 34 for respectively receiving one end portion of a pair of relatively small spring steel rods 68 and 69, such as a length of 0.062 inch (0.158 cm) diameter piano wire, with the other end of the respective rod 68 and 69 projecting into a suitable aperture longitudinally formed in one end portion of a pair of elongated strap metal control arms 70 and 71 overlying the top surface of the rear chassis 18 and projecting at their other ends a selected distance toward the forward limit of the base 16. The length of the rods 68 and 69, between the respective post and arm, is preferably 1 inch (2.54 cm). The rods 68 and 69 are staked in place in the respective posts and arms. The forward end portion of the control arms 70 and 71 are provided with upstanding film carriage receiving pins 72 and 73 for receiving the film carriage apertured ears 50 and 52, respectively.

A centrally bored cylindrical eccentric dial motion guide 74 projects upwardly through a suitable opening formed in the top surface of the forward chassis 20 and partially underlies the film carriage forward ear 48. The motion guide 74 is supported for angular rotation by an axle 76 journalled by zero tolerance bearings 78 contained by a housing 80 secured to a platform 82 underlying the motion guide 74 and secured to the depending surface of the forward chassis 20 in downwardly spaced relation by spacers 84.

An electric motor 86, connected with a source of electrical energy, not shown, through a switch 87, depends from and is similarly supported by the platform 82 with its drive shaft 88 driving a belt 90 entrained in a suitable groove around the periphery of the motion guide 74. The motion guide 74 includes a body portion 91 characterized by an eccentric counterbore 92 and a coaxial counterbore 94 in its upper end portion with the counterbore 94 defining a hub 95 coaxially receiving a spur gear 96 diametrically smaller than the outer diameter of the counterbore 94. An eccentricity of 0.0625 inch (0.15875 cm) for the counterbore 92 has proven satisfactory, thus providing a maximum of 0.125 inch (0.3175 cm) movement of the film carriage 46, as presently explained.

The eccentric counterbore 92 receives a dial plate 98 characterized by a downwardly and outwardly facing rabbeted edge 100 which receives, in frictional sliding relation, the inward end portion of a plurality of set screws 102 which tend to bias the dial plate 98 downwardly and maintain it within the counterbore 92 during angular rotation of the dial plate relative to the body 91 and stationary relative to the body during angular rotation of the body, for reasons believed readily apparent. The top surface of the dial plate is scored with a row of indicia indicating units of measurements and is provided with a radially offset bore 104 intersecting the teeth of the spur gear 96 for receiving a pinion 106 formed on one end portion of a shaft-like dial adjustment key 108 for the purposes of angular rotation of the dial plate 98 with respect to the body 91 and moving its zero starting line indicia with respect to the zero position for modifying film images, as presently explained.

The drive bore 109 of the dial plate 98 rigidly supports an upstanding film carriage drive mandrel 110 for connection with the film carriage aperture ear 48. A zero tolerance fit is formed between the film carriage ears 48, 50 and 52 with respect to the film carriage receiving pins 72 and 73 and drive mandrel 110 by a plastic material bushing 112, having a centrally apertured generally U-shaped, in diametric section, central portion snugly receiving the respective pin in a zero tolerance friction fitting relation. The bushing 112 is snugly received by the respective aperture in the respective film carriage ear. The bushing 112 is further characterized by an annular flange overlying the upper surface of the film carriage 46.

A register bar 114 coextensive with the width of the face plate 42 is disposed adjacent its forward edge and supported for vertical movement toward and away from the plane of the face plate by a pair of leaf springs 116 and 118 connected at one end with the depending surface of the respective end portion of the register bar and secured at their other ends to the top surface of the forward chassis 20 by spring clamps 120 and 122. The purpose of vertical movement of the register bar 114 is to permit freedom of movement of the film carriage 46 as presently explained. A pair of register bar elevators 124 and 126 are slidably supported by the top surface of the rearward chassis 18 for sliding movement toward and away from the respective end of the register bar 114.

Figure 9:
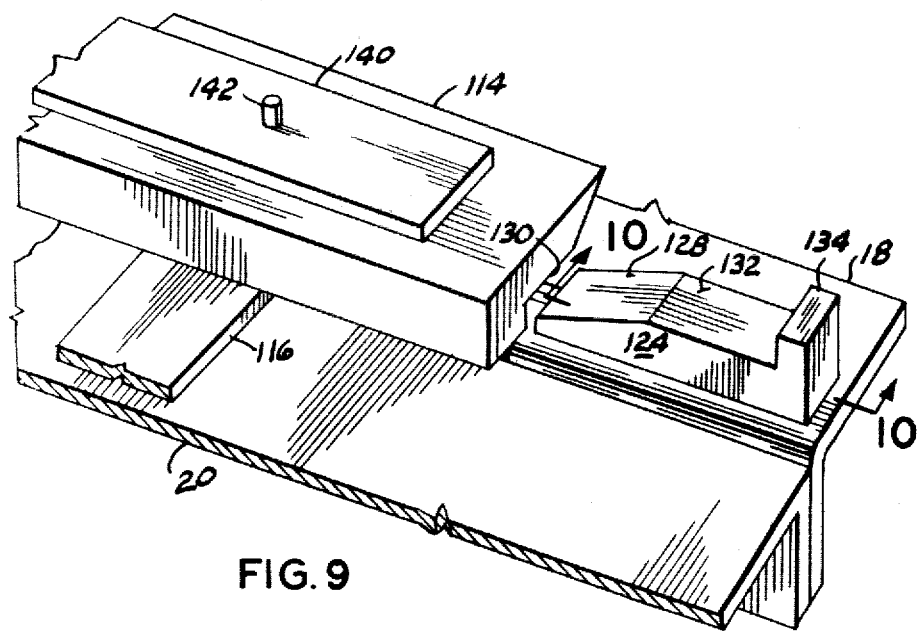
FIG. 9 is a fragmentary perspective view, partially in section, of one end portion of the register bar and associated elevator.
Figure 10:
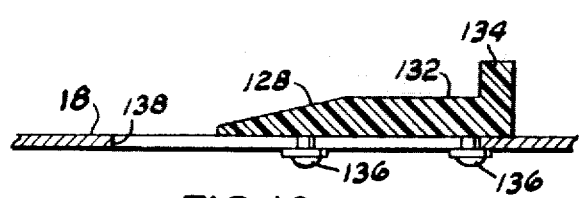
FIG. 10 is a fragmentary vertical cross sectional view taken substantially along the line 10—10 of FIG. 9.

As shown by FIG. 9, each of the elevators 124 and 126 are characterized by an inclined surface 128 for slidably contacting the depending surface 130 of the register bar and a horizontal portion 132 which supports the upper surface of the register bar in the plane of the top surface of the face plate 42 when the elevators are moved under the adjacent end of the register bar with an upstanding stop 134 at its end opposite the inclined surface. The respective elevator is secured to the chassis 18 by a pair of pins 136, or the like, depending from the elevator and slidably received longitudinally within a slot 138.

A selected film registration pin bar 140 is longitudinally secured to the upper surface of the register bar 114 and includes a plurality of film registration pins 142, or the like, for registering films on the face plate 42 in a conventional manner.

A light source intensity control 144 and a light timer 146 are mounted on the forward chassis 20 and connected with the source of electrical energy through a switch 148. A conventional dial indicator 150 is mounted in a suitable aperture on the forward chassis 20 forwardly of the film carriage 46. The indicator 150 is provided with a contact 152 abutting the adjacent edge of the film carriage 46 which spring biases an indicator arm 154 and records movement of the film carriage in thousandths of an inch or centimeter. The purpose of the dial indicator 150 is to double-check the amplitude of movement imparted to the film carriage 46 as a control measure in accordance with the desired setting of the eccentric dial drive guide 74.

In FIGS. 11 through 14, the apparatus 12 has been omitted for simplicity and the photographic films illustrated, in exploded perspective, as they would appear when attached to the apparatus. A type character is illustrated in FIGS. 11 and 12 as an example of the image to be modified, however, any image can be modified in the manner presently described.

Definition of the photographic terms used hereinafter are as follows:

Negative: where the image of a type character is clear on an opaque film;

Positive: where the image of a type character is opaque on a clear film;

Plus image: a modified film image produced by orbital motion of the apparatus from a negative of original copy wherein a uniform amount of image area has been added to all defining edges of the image on the negative; and, Minus image: a modified film image produced by orbital motion of the apparatus from a positive of the original copy wherein a uniform amount of image area has been subtracted from all defining edges of the image on the positive.

In practicing the invention, a film negative 160 containing an image to be modified is attached by tape, not shown, to the smaller of the box areas revealed on the forward surface of the film carriage 46 when supported by the backboard 36 with the position of the type character inverted and the emulsion side of the negative facing away from the film carriage. A similar size section of unexposed film having an edge portion punched or otherwise modified for repeated registration on the pins 142 on the registration bar 140, when the register bar 114 is lifted by the elevators 124 and 126, is disposed emulsion side up and taped on the corresponding box area of the face plate 42. The register bar 114 is then released, after removing the unexposed film from the pins 142, by moving the elevators 124 and 126 toward the respective side panel 32 and 34.

Best results are obtained by using high contrast film, such as Kodalith MP and MP11 line film marketed by Eastman Kodak Co., Rochester, N.Y. 14650 or DuPont CBC-4 and CLF-4 line film marketed by E. I. DuPont de Nemours and Co., Inc., 1600 Hurd Drive, Irving, Tex. 75062. Obviously other film with similar characteristics may be used.

The film carriage 46 is removed from the backboard 36 by manually grasping its ear portions 50 and 52 and placing it in overlying position on the face plate 42 with the bushings 112 in these ears surrounding the control arm pins 72 and 73. The bushing 112 in the film carriage ear 48 is similarly disposed over the eccentric dial drive mandrel 110. The film carriage 46 thus forms the fourth side of a parallelogram wherein lateral movement of the film carriage is permitted by the flexibility of the rods 68 and 69 and front to back movement of the film carriage is permitted by angular rotation of the shaft 58. The eccentric dial 74 is then manually adjusted by using the key 108 to rotate the dial plate 98 so that the indicia indicates a desired magnitude of movement of the film carriage 46. The motion indicator contact 152 is positioned in contact with the forward edge of the film carriage, as described hereinabove, and manually adjusted so that its indicator 154 is at zero. With the point light source 14 deenergized a trial motion movement of the film carriage is initiated by starting the motor 86 while observing the movement of the dial indicator arm 154 in opposing directions to insure the desired magnitude of movement is being imparted to the film carriage. In the event the initial setting of the eccentric dial plate 98 does not produce the desired orbital motion, the setting of the eccentric dial and indicator is repeated until desired orbital movement of the film carriage is achieved. Thereafter, the light intensity control 144 and timer 146 are set for the desired duration, in accordance with predetermined parameters, and activated by the switch 148 simultaneously with operation of the motor 86. The resulting exposure produces a plus image on the film 162 when the latter is developed or, conversely, a plus image negative of the type character when using a duplicating film, not shown, in place of the film 162.

FIG. 12 illustrates an identical operation of the apparatus for producing a minus negative image on a film 164 obtained by using a positive film 156 containing the type character.

FIG. 13 illustrates a fragment of a film containing a graphic image, such as a star, 168 to be modified to form a plus image, as indicated at 170, wherein the acute angle or points of the star image 168 produce a full radius line around the respective tip of the star image.

The apparatus is particularly adapted for use in modifying microcircuitry diagrams wherein the air gap between adjacent conductors is critical.

Obviously the invention is susceptible to changes or alterations without defeating its practicability. Therefore, I do not wish to be confined to the preferred embodiment shown in the drawings and described herein.

I claim:

1. In a graphics modifier having a planar base defining forward and rearward ends and supported by opposing side panels, a stationary face plate overlying the base and a planar transparent film carriage superposed on the face plate, the improvement comprising:
   motion guide means mounted on said base and connected with a marginal edge portion of said film carriage for moving said film carriage in an orbital path of predetermined magnitude;
   motor means drivably connected with said motion guide means; and,
   arm, shaft and flexible rod means connecting opposing marginal edge portions of said film carriage remote from said motion guide means with said base for maintaining marginal edges of said film carriage parallel with the respective marginal edges of said base during motion guide means induced orbital movement.

2. The combination according to claim 1 in which said arm, shaft and flexible rod means includes:
   a shaft extending between and journalled by said side panels;
   a post rigidly secured to the respective end portion of said shaft and projecting upwardly through said planar base, said planar base having an aperture loosely surrounding the respective said post;
   an elongated plate-like arm overlying said planar base adjacent and parallel with the respective side panel;
   an elongated spring steel rod extending between and rigidly secured to the respective said post and adjacent end of the respective said arm parallel with the respective said side panel; and,
   pin means removably connecting the other end portion of said arms with said opposing marginal edge portions of said film carriage.

3. The combination according to claim 2 in which said motion guide means includes:
   a centrally bored cylindrical body projecting upwardly through said planar base forwardly of said face plate with its upper limit adjacent the plane of said film carriage, said body having an eccentric counterbore in its inner end;
   axle means supported by the depending surface of said planar base for journalling said body;
   a dial plate disposed within the eccentric counterbore for angular rotation relative to said body;
   means maintaining said dial plate in a predetermined position, said dial plate having a drive bore coaxial with the body central bore when said dial plate is in a starting position; and,
   a drive mandrel within the dial plate drive bore for driving said film carriage.

4. The combination according to claim 3 in which said body is characterized by a coaxial counterbore inwardly of the eccentric counterbore defining a hub and further including:
   a spur gear surrounding said hub, said dial plate having a radially offset bore communicating with the teeth of said spur gear; and,
   a shaft-like key having a pinion on one end engaging said spur gear teeth for angular rotation of said dial plate relative to said body.

5. The combination according to claim 1 or 4 and further including:
   film register bar means extending transversely of said planar base between said face plate and said motion guide means;
   spring means supporting said register bar means for vertical movement toward and away from said planar base; and,
   elevator means slidably supported by said planar base adjacent the respective end of said register bar means for supporting said register bar means in the plane of said face plate.

6. The combination according to claim 5 and further including:
   motion indicator means supported by said planar base adjacent the forward edge of said film carriage for visually indicating the magnitude of movement of said film carriage.

7. The combination according to claim 5 and further including:
   an upstanding backboard having overall dimensions at least equal with respect to said face plate supported by the rearward end of said planar base; and,
   at least one pin on said backboard for temporarily supporting said film carriage.

* * * * *